United States Patent [19]

Siwula

[11] 4,308,588
[45] * Dec. 29, 1981

[54] ELECTRONIC CHECKBOOK

[76] Inventor: John T. Siwula, 145 Sanford Dr., Jamestown, N.Y. 14701

[*] Notice: The portion of the term of this patent subsequent to Sep. 9, 1997, has been disclaimed.

[21] Appl. No.: 131,645

[22] Filed: Mar. 19, 1980

Related U.S. Application Data

[63] Continuation of Ser. No. 912,925, Jun. 5, 1978, Pat. No. 4,222,109.

[51] Int. Cl.³ .............................................. G06F 15/30
[52] U.S. Cl. ..................................... 364/715; 364/705; 364/408
[58] Field of Search ......................... 364/715, 705, 408

[56] References Cited

U.S. PATENT DOCUMENTS 3,920,979 11/1975 Kilby et al. ......................... 364/705
4,075,702 2/1978 Davis .................................. 364/705

OTHER PUBLICATIONS

"Mostek to Sell 2-Function Unit for Checkbooks" *Electronics,* Mar. 20, 1975 p. 26.
"Compact, Diary, Checkbook all Count" *Electronics,* Apr. 3, 1975, pp. 40-41.

*Primary Examiner*—David H. Malzahn
*Attorney, Agent, or Firm*—Christel, Bean & Linihan

[57] ABSTRACT (1.) An electronic checkbook consisting of:
 (A.) a dedicated microprocessor which continues to perform a specific function and store the information on a day to day basis, even when not otherwise in use,
 (B.) Checks.
 (C.) Checking stubs with numbers corresponding to the checks upon which can be kept handwritten records of the balance, checks written, and deposits made.
 (D.) Checking account deposit slips.
 (E.) A folder containing all of the above .
In regards to the dedicated microprocessor, four high priority routines are present which are able to interrupt the main program:
 (1.) When the "STOP" position is selected, it halts the processor and turns off the display.
 (2.) Depressing the "CLEAR" button will clear the display and second register if not in "STOP".
 (3.) When the "REMOVE PROTECT" button is depressed, the contents of the memory effectively become zero, if not in "STOP".
 (4.) When the "POST BALANCE" button is depressed, the contents of the display are added to the contents of memory, if not in "STOP". When the unit is set at "START" the contents of the memory will appear in the display.

5 Claims, 5 Drawing Figures

ELECTRONIC CHECKBOOK

This is a continuation of application Ser. No. 912,925 filed June 5, 1978, now U.S. Pat. No. 4,222,109.

CROSS REFERENCES

U.S. Pat. No. 4,075,702 issued in February, 1978 refers to a calculator used in combination with a checkbook. These calculators serve multiple purposes such as division, multiplication, addition, square roots, subtraction, etc. and in no way differ from other calculators for other purposes. In contrast, the electronic checkbook is a dedicated microprocessor which will maintain a checking account balance and store that balance on a day to day basis, even when the machine is not in use, unless there is a failure of the physical components.

DESCRIPTION OF THE PRIOR ART AND SUMMARY OF THE INVENTION

This invention relates to an electronic checkbook for providing a means to facilitate the computation, maintenance, and storage of a checking account balance. Manually adding deposits and subtracting check amounts from a checking account balance is a time consuming nuisance, particularly when shopping or paying bills. The possibility exists that many individuals will write out several checks without balancing their checkbook. This results in a possible unknown immediate balance of the checking account of the user of a regular checkbook. A device has been developed in the past which involves the incorporation of a calculator along with a checkbook in a folder. These calculators are multipurpose devices, i.e. the registers are shared with multiplying, dividing, etc. (See U.S. Pat. No. 4,075,702, February, 1978). Inherently these devices are composed of potentially unnecessary complexity of function for maintaining checking account balances. They do not support the sequence of a checking account. They are merely useful tools. The electronic checkbook is dedicated to the problem of checking account balances and maintains the continuity of the process.

The present invention relates to an electronic checkbook which can be made inexpensively and produced in a very compact portable package. It is designed specifically for the computation and storage of checking account balances and will both store the balance of the account even when the machine is not in use as well as enforce portions of the computational sequence. The embodiment of the device is of such a nature that when the unit is not in use, the contents of memory are absolutely preserved, short of some failure of the physical components. In the initial embodiment, the components used require that the battery power does not fail or be interrupted in order to maintain the integrity of the stored contents of memory. Other components that are presently available are non-volatile in their memory characteristics. Examples are magnetic ferrite core, electronically alterable integrated circuits, and various film technologies, to list a few. The concept of storing the required memory as a normal portion of the inactive operating cycle of a device of this type, is not predicated on any of these specified techniques of memory and they are mentioned only to illustrate less optimum choices which are presently available, although any other choice might be favorable at another time. Other objects and purposes of the invention are clarified by the following detailed description of the drawings.

DETAILED DESCRIPTION OF THE DRAWINGS

Figure 1:
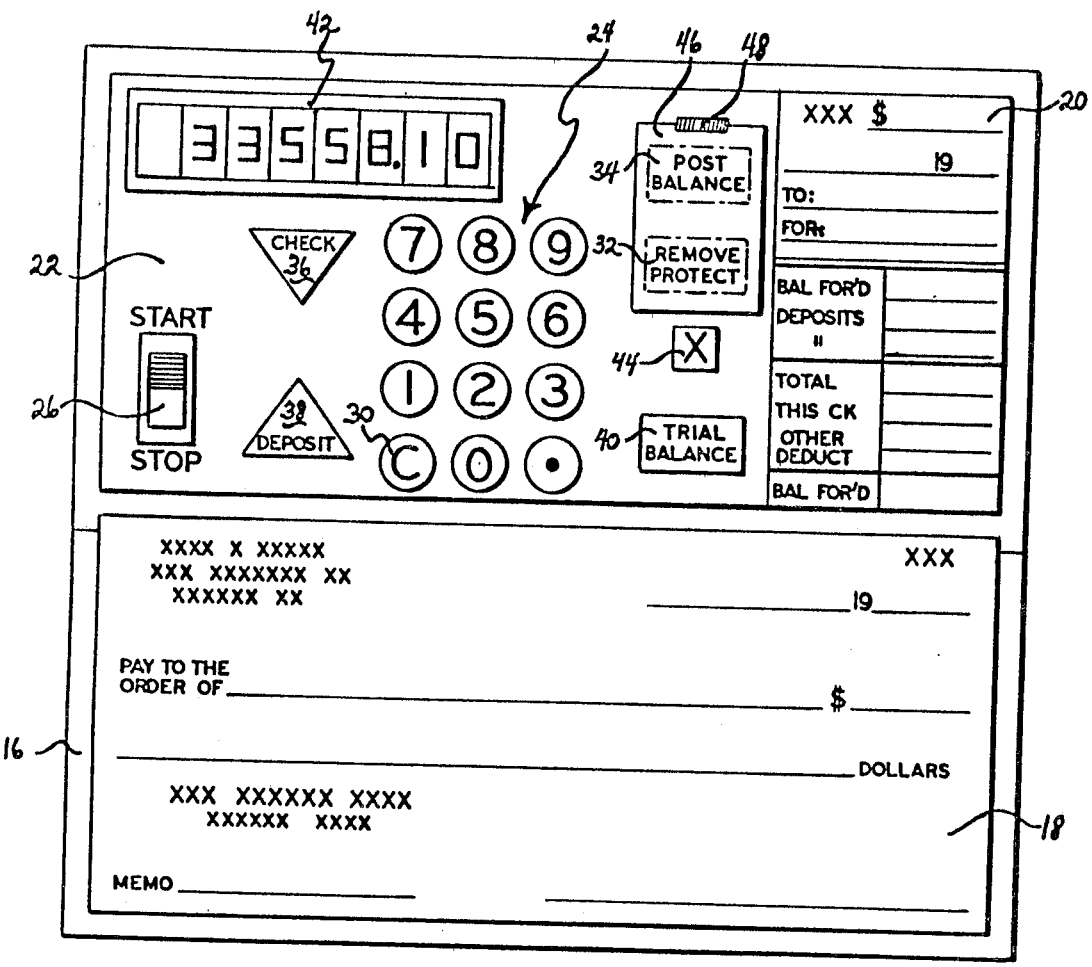
FIG. 1 illustrates a perspective view of the interior of the folder containing the electronic checkbook.

Reference is now made to FIG. 1 which shows a perspective view of the interior of the folder 16 containing the electronic checkbook. The lower portion of the folder 16 contains standard size checks 18 bound together with checking account deposit tickets 18. On the right side of the upper portion of FIG. 1 are check stubs 20 possessing numbers corresponding to the standard checks located in the lower portion of the folder and functioning as a place where the user could manually record the amount of the check written, who it was written to, and what it was written for. The stub also provides a space where the user could make a written record of his balance, deposits, and the amounts of the checks he has written. The left hand side of the upper portion of the checkbook contains a view of the panel 22 of the electronic device. As can be seen in FIG. 1, the electronic checkbook can be made to be compact, portable, and operate from internal battery source. The keyboard, indicated generally as 24, is composed of ten numerical keys, a clear key, a decimal point key, plus a number of function keys. Following is an explanation of how a user of the electronic checkbook would operate the device using both the keyboard and function keys.

(1) When the battery is installed, all registers will reset to ZERO balance.

(2) If by some sequence you find you have a wrong balance, use the following sequence to clear all registers: (A.) Move the Start-Stop switch 26 to "START". (B.) Depress the "CLEAR" button 30. (C.) Depress the "REMOVE PROTECT" button 32. (D.) Depress the "POST BALANCE" button 34. (E.) Move the Start-Stop switch 26 to "STOP". (F.) The balance will now be set at zero.

(3) A. To make a deposit or a series of deposits, use the following sequence: (1) Move the Start-Stop switch 26 to "Start". Your balance will now appear in the display 42. (2) Press the "DEPOSIT" button 38. (3) Key in the deposit amount on the keyboard 24. (4) Press the "TRIAL BALANCE" button 40 for each deposit. (5) To store the new balance, press the "REMOVE PROTECT" button 32 and then the "POST BALANCE" button 34.

B. To see how many checks you will be able to draw against your present balance, perform the following sequence: (1) Move the Start-Stop switch 26 to "START". Your balance will show on the display 42. (2) Press the "CHECK" button 36. (3) Key in the amount of the check on the keyboard 24. (4) Press the "TRIAL BALANCE" button 40 for each check. Each time you reach a trial balance, the remainder will update. As long as you do not strike the last two keys (REMOVE PROTECT 32, POST BALANCE 34) to post the balance, you will not alter the stored balance. When you are finished, move the Start-Stop switch 26 to "STOP". The balance will be as it had been before you started. When you go back to the "START" position, the balance you stored will appear in the display 42. It should be noted that the display 42 is a register. Its contents are constantly displayed on the digital display except when a key is depressed or when the Start-Stop switch 26 is on "STOP".

(4) When you are prepared to enter your trial balance as your new balance, perform the following operations.

(a) Push the button labeled "X" 44. This will cause the protective cover 46 located over the "REMOVE PROTECT" 32 and "POST BALANCE" 34 buttons to spring open. After the protective cover has opened, press "REMOVE PROTECT" 32 and then "POST BALANCE" 34. Do not press "POST BALANCE" 34 more than once as this will cause an error. If you think it might be wrong simply press "REMOVE PROTECT" 32 again and then press "POST BALANCE" 34 after you have released "REMOVE PROTECT" 32. Whatever balance is showing on the display 42 when you enter the sequence "REMOVE PROTECT" 32 "POST BALANCE" 34, will then be stored in the balance register.

(5) When you are finished, if you want to check that the correct balance is being saved, move the Start-Stop switch 26 to "STOP". "START" again and the amount stored in the register 42 will be displayed.

(6) If your balance is an even number of dollars or dimes, the balance will be displayed without the end zeros. This will not alter the accuracy of your electronic checkbook.

The digital display 42 may consist of either an L.E.D. (light emitting diode) or L.C.D. (liquid crystal display) or any device capable of producing such a display. The stored balance of the checkbook would be displayed here when the machine is activated. Individual check or deposit entries would also appear here as they are entered into the machine. New balances, resulting from adding deposits or substracting checks after pressing the "TRIAL BALANCE" button 40 would also appear here.

A spring 48 opens the protective cover 46 located over the "REMOVE PROTECT" 32 and "POST BALANCE" 34 buttons. The function of the protective cover 46 is to keep the "REMOVE PROTECT" 32 and "POST BALANCE" 34 buttons from being accidentally depressed.

Figure 2:
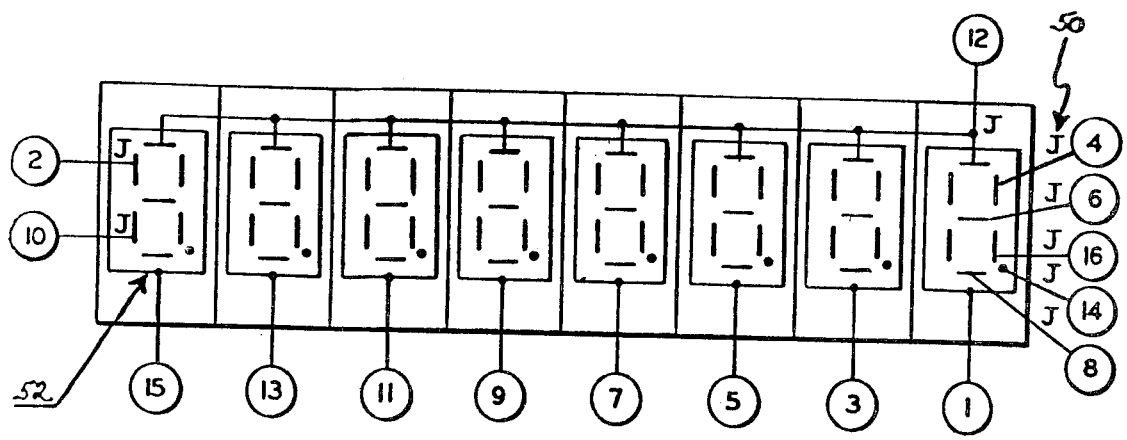
FIG. 2 illustrates a front view of the character display.
Figure 3:
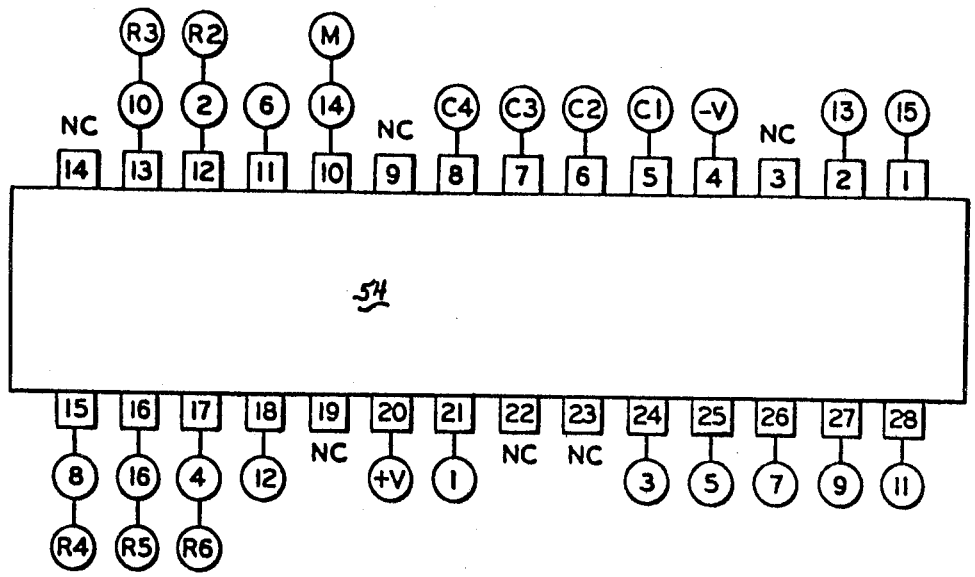
FIG. 3 illustrates the dedicated microprocessing unit.
Figure 4:
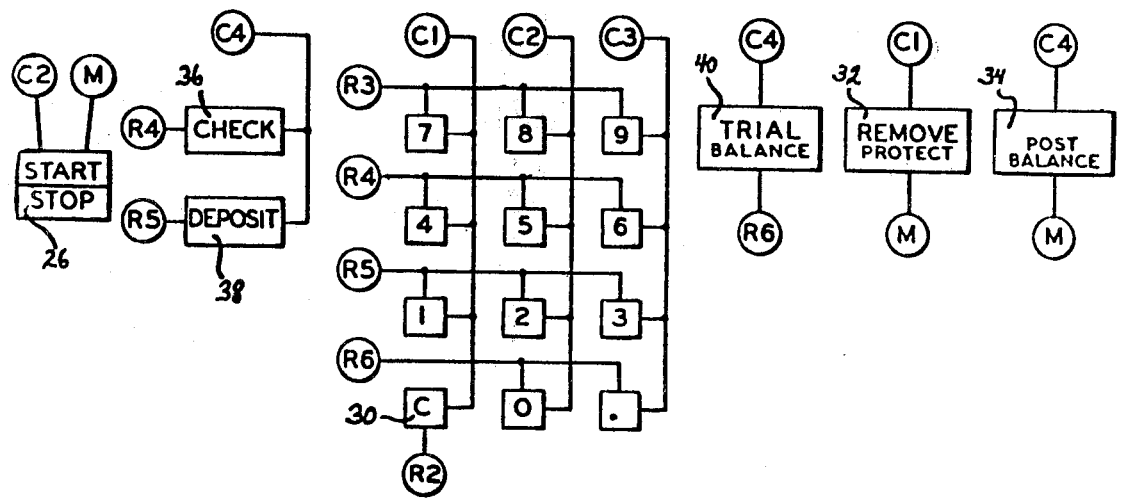
FIG. 4 is a switch interconnection diagram relating to FIG. 3.
Figure 5:
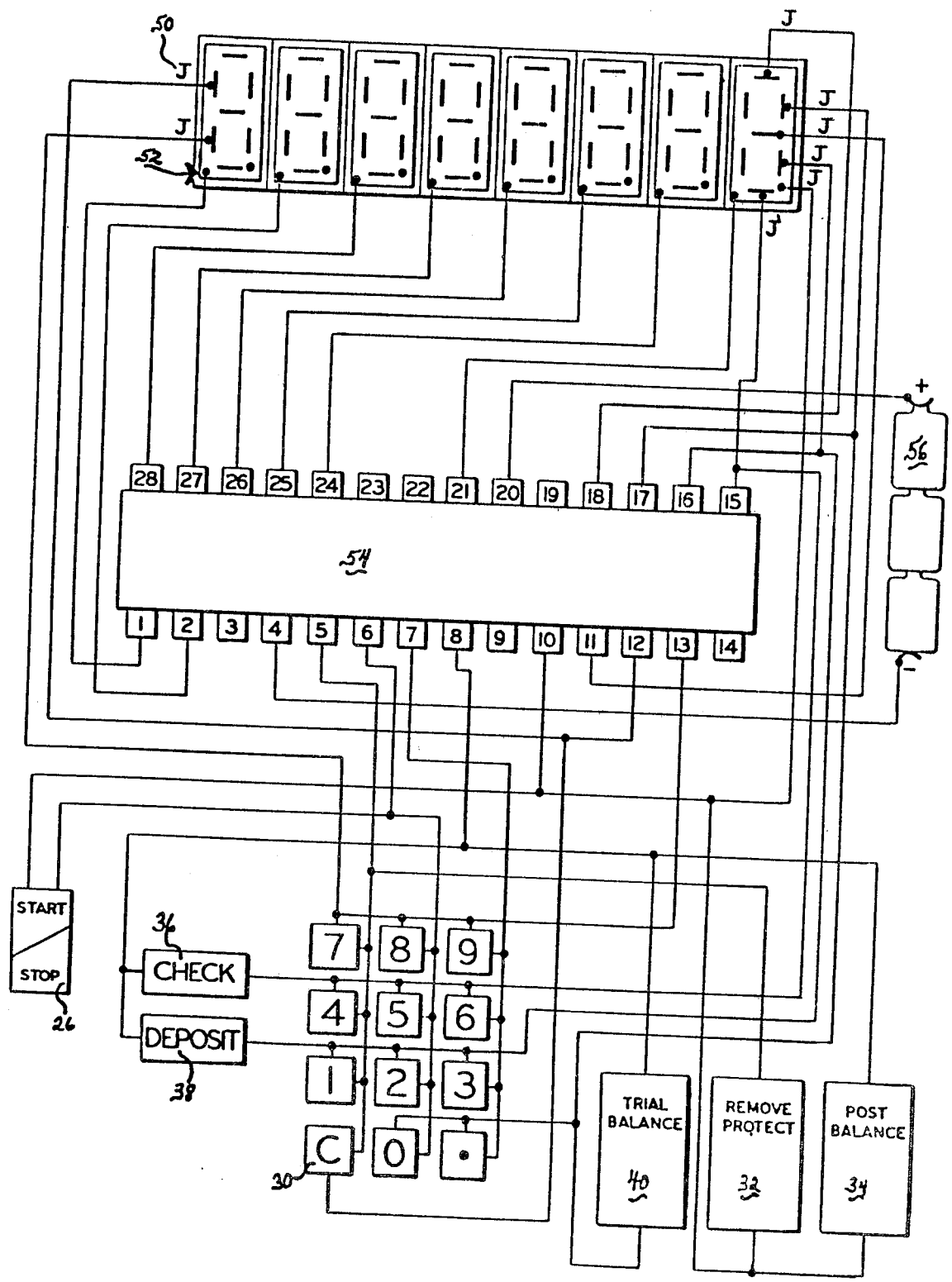
FIG. 5 illustrates a schematic of the electronic circuitry of the electronic checkbook.

FIGS. 2, 3, 4, and 5 refer to the description of the embodiment of the electronic checkbook function which follows. Before describing such function, several items in the aforementioned drawings are refered to. FIG. 2 represents a front view of the character display showing the wiring relationship. All connections labeled "J" 50 in FIG. 2 are typical of eight corresponding character locations. "J" 50 illustrates the portion of that character that is connected to all eight. Reference is also made to the substrate connection 52 to select the character. The dedicated microprocessor 54 is depicted in FIG. 3. FIG. 4 represents the switch closure table and FIG. 5 of the device connected to internal battery source 56.

The detailed description of the embodiment of the electronic checkbook function is referred to as follows. The data collection, and logical processing of the electronic checkbook may all be accomplished on a single chip computer. The computer may be a fixed program type, sometimes called a calculator chip. The program sequentially tests for a closure to occur between pins 5,6,7, or 8 of the package, and pins, 10,12,13,15,16, or 17 of the package. When such a closure is detected, the chip processing halts until the closure ceases. Upon termination of the closure, the processor executes an appropriate response. Of the 24 possible selections which may be achieved by connecting one of the group of four to any one of the group of six, each has a different significance. Table 1 shows the specific responses for each of the closures used.

TABLE 1

| First Group Pin | Second Group Pin | Designation | Response |
|---|---|---|---|
| 5 | 10 | REMOVE PROTECT | set memory to ZERO |
| 6 | 10 | START | display memory |
| 8 | 10 | POST BALANCE | add display to memory |
| 5 | 13 | 7 | enter 7 |
| 6 | 13 | 8 | enter 8 |
| 7 | 13 | 9 enter 9 | |
| 5 | 15 | 4 | enter 4 |
| 6 | 15 | 5 | enter 5 |
| 7 | 15 | 6 | enter 6 |
| 5 | 16 | 1 | enter 1 |
| 6 | 16 | 2 | enter 2 |
| 7 | 16 | 3 | enter 3 |
| 6 | 17 | 0 | enter 0 |
| 5 | 12 | C | clear display |
| 7 | 17 | . | enter decimal |
| 8 | 15 | CHECK | subtract next entry |
| 8 | 16 | DEPOSIT | add next entry |
| 8 | 17 | TRIAL BALANCE | tally last instruction |

Many changes and modifications in the above described embodiment of the invention can of course be carried out without departing from the scope thereof. Accordingly, that scope is intended to be limited only by the scope of the appended claims.

What is claimed is:

1. An electronic checkbook comprising:
   (a) a carrier member having first and second surface portions;
   (b) a plurality of checks connected to one of said surface portions;
   (c) a plurality of record members connected to one of said surface portions, said record members each having indicia and guidelines for recording of hand written information thereon;
   (d) a microprocessor attached to one of said surface portions for computing and maintaining numerical information quantities related to the information contained in said record members; and
   (e) said record members and said microprocessor being located on said carrier member in directly adjacent relation.

2. Apparatus according to claim 1, wherein said carrier member is a sheet provided with a fold along a midline to provide a folder wherein said first and second surface portions are on the same side of said sheet and separated by said fold.

3. Apparatus according to claim 1, wherein said microprocessor includes means for storing information even when said microprocessor is not otherwise in use, means for recalling stored information, and means for displaying stored information upon start whereby displayed information can be affected by the performance of any computational operation or sequence of computational operations and again displayed for error avoidance of approval whereupon the amount may then be stored in the same manner.

4. Apparatus according to claim 1, wherein said record members are individually removably connected to one of said surface portions of said carrier member.

5. Apparatus according to claim 1, wherein said checks are located on one of said surface portions of said carrier member and said microprocessor and record members are located on the other of said surface portions.

* * * * *

UNITED STATES PATENT AND TRADEMARK OFFICE
CERTIFICATE OF CORRECTION

PATENT NO. : 4,308,588
DATED : December 29, 1981
INVENTOR(S) : John T. Siwula

It is certified that error appears in the above-identified patent and that said Letters Patent are hereby corrected as shown below:

Claim 3, line 9 the word "of" should read --or--.

Signed and Sealed this

Fifteenth Day of June 1982

[SEAL]

Attest:

Attesting Officer

GERALD J. MOSSINGHOFF
Commissioner of Patents and Trademarks